United States Patent [19]

Christianson

[11] Patent Number: 4,603,833

[45] Date of Patent: Aug. 5, 1986

[54] INLET VALVE FOR BREATHING APPARATUS SECOND STAGE REGULATORS

[76] Inventor: Tony Christianson, 120 8th St., Manhattan Beach, Calif. 90266

[21] Appl. No.: 388,176

[22] Filed: Jun. 14, 1982

[51] Int. Cl.$^4$ .................. F16K 35/00; F16K 35/02; F16K 31/143

[52] U.S. Cl. .................. 251/94; 128/202.27; 128/202.28; 251/98; 251/111

[58] Field of Search ............ 128/202.27, 205.24; 251/149.2, 149.9, 90, 94, 89.5, 89, 111, 113, 114, 115, 116, 95, 98, 297, 286, 288

[56] References Cited

U.S. PATENT DOCUMENTS

| | | | |
|---|---|---|---|
| 804,272 | 11/1905 | Schwarz | 128/205.24 |
| 849,121 | 4/1907 | GeFrorer | 251/288 |
| 1,248,957 | 12/1917 | Voight | 251/115 |
| 1,984,828 | 12/1934 | Fornwalt | 251/94 |
| 2,817,489 | 12/1957 | Hesmer | 251/305 |
| 3,238,943 | 3/1966 | Holley | 128/202.27 |
| 3,341,088 | 9/1967 | Moynihan | 251/297 |
| 4,304,229 | 12/1981 | Curtin | 128/205.24 |

Primary Examiner—G. L. Walton
Attorney, Agent, or Firm—Spensley Horn Jubas & Lubitz

[57] ABSTRACT

An inlet valve for use with a breathing regulator second stage which is connectable to a source of breathable gas. The inlet valve containing a flow-closing valve in the passages and being connectable in the gas circuit to the second stage. Extending externally of the valve body the inlet valve includes a control member. A detent member is attached to the valve body. The detent member having an element projecting externally to the valve body. Also, the detent member being urged into an orientation in which the element retains the control member with the valve in an open flow enabling position. The detent member comprises a piston in the valve body having an end within the passage and exposed to the inlet gas pressure therein. The piston having an element projecting through an opening in the valve body the piston being situated so that the control member will be retained with the valve in the open flow enabling position when the piston element is urged outwardly of the valve body the pressure of gas from the source.

2 Claims, 5 Drawing Figures

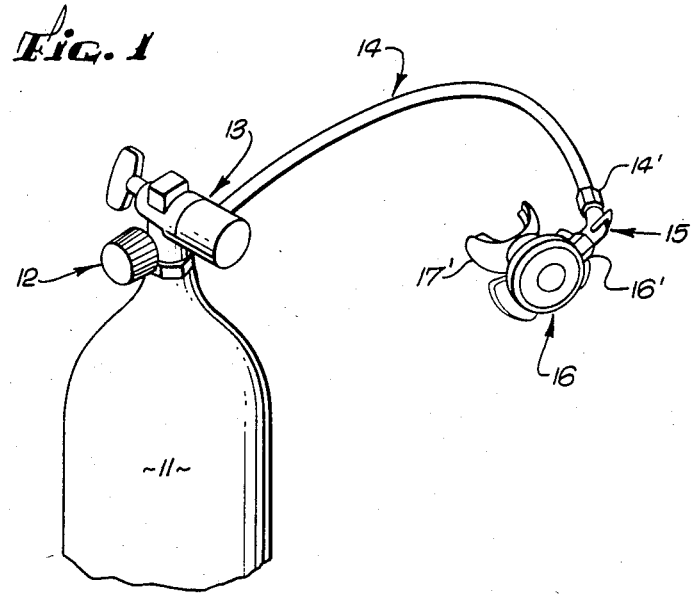
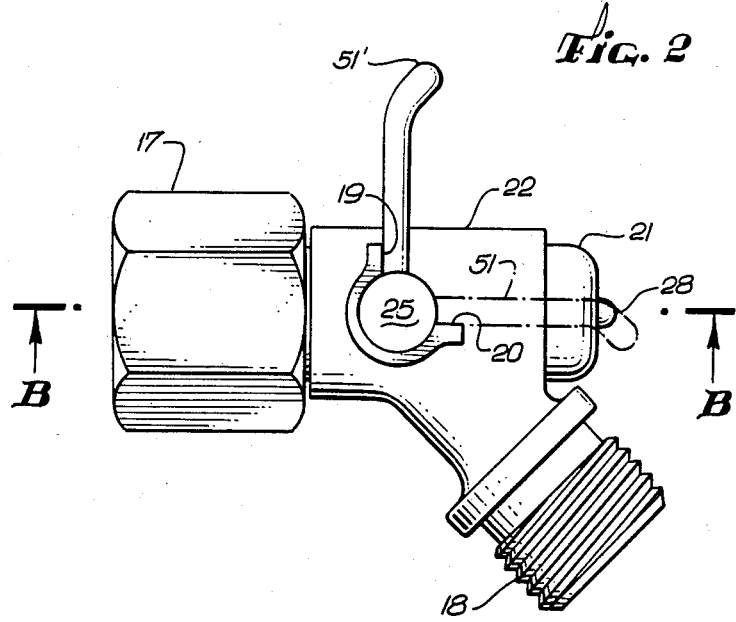

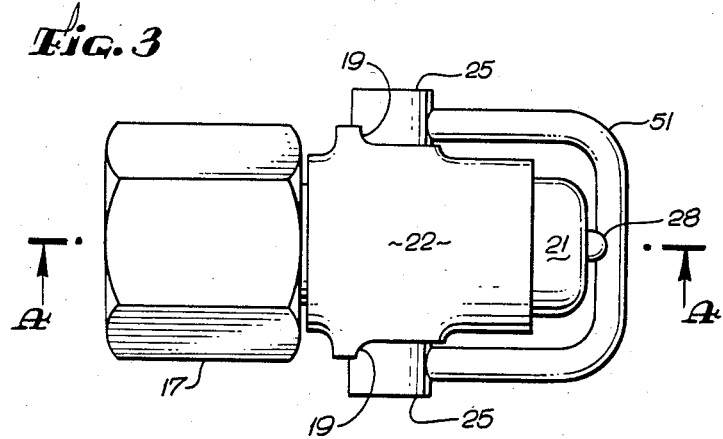
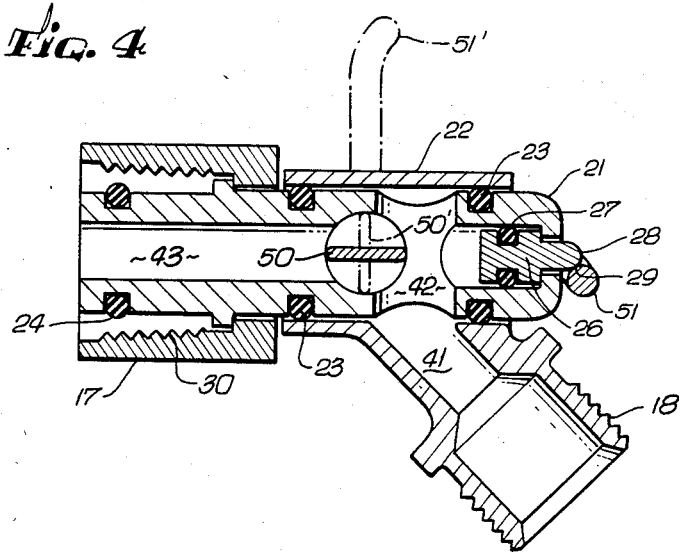
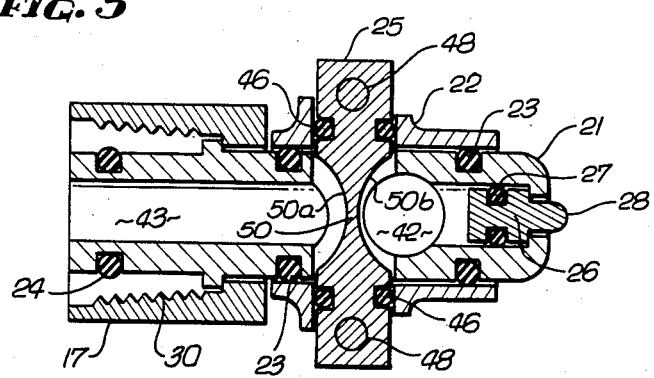

4,603,833

INLET VALVE FOR BREATHING APPARATUS SECOND STAGE REGULATORS

BACKGROUND OF THE INVENTION

1. Field of the Invention

The present invention relates to regulators for underwater breathing apparatus and more particularly to an inlet valve for second stage regulators.

2. Description of the Prior Art

In a typical underwater breathing apparatus, air or other breathable gas is supplied to a diver from a high pressure tank via a two-stage regulating system. The regulator first stage is mounted to the high pressure tank valve and functions to reduce tank gas pressure to about 150 psi above ambient pressure. The tank and regulator first stage are carried by the diver on his back. A flexible hose conduit supplies the reduced pressure gas to a regulator second stage held by the diver in his mouth with a mouthpiece. The second stage is a demand regulating device which opens to supply the diver's mouth breathing gas in response to inhalation effort. Provision is also made to exhaust exhaled gas through the mouthpiece out into the water.

For convenience and safety, the diver opens the pressure tank valve prior to entering the water. Once the tank is mounted on the diver's back, it is very difficult for the diver to manipulate the tank valve himself. As a consequence, the diver usually leaves the gas supply valve open, even when not breathing through the regulator, for example, when snorkeling on the water surface. Unfortunately, the unattended regulator tends to free flow with a resultant waste of gas whenever water surges against the regulator second stage or it is otherwise jolted. To date, there is not a convenient and safe method for the diver to open or close his gas supply after the tank supply valve is opened and the system is mounted on his back.

The present invention solves the problem by providing a shut-off means which is conveniently mounted at the inlet to the regulator second stage.

SUMMARY OF THE INVENTION

The objective of the present invention is to provide a means to prevent inadvertent gas flow from second stage regulators when the supply gas tank valve is open but the regulator is not being used. This objective is achieved by the inventive device in the following ways: (a) the device provides the means to open and close the hose conduit between the first and second stages, (b) the device is quick acting, that is, the device can be changed from closed to open or the reverse with a quick switch-like movement, (c) the device latches firmly in the open position, (d) the device is conveniently located at the inlet to the regulator second stage.

Another objective of the present invention is to provide a valve device which can be easily installed on any regulator second stage marketed by the diving industry.

Another objective of the present invention is to increase the rotational mobility of the hose connection to the regulator second stage.

BRIEF DESCRIPTION OF THE DRAWINGS

A detailed description of the invention will be made with reference to the accompanying drawings wherein like numerals designate corresponding parts in the several figures.

FIG. 1 is a perspective view of an underwater breathing apparatus incorporating the inventive inlet valve at the regulator second stage.

FIG. 2 is a side view of the inventive device shown in the closed position. The open position is represented in the figure by dot-dash phantom lines.

FIG. 3 is a top view of the inventive device shown in the open position.

FIG. 4 is a sectional side view as seen along line A—A of FIG. 3. The closed position is represented in the figure by dot-dash phantom lines.

FIG. 5 is a sectional top view as seen along line B—B of FIG. 2.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention since the scope of the invention is best defined by the appended claims.

In FIG. 1 there is shown an underwater breathing system incorporating the inventive inlet valve 15. Supply tank 11 contains breathable gas under high pressure. Tank 11 is topped by valve 12 to which is attached regulator first stage 13. Regulator 13 reduces the pressure of the gas in tank 11 to an intermediate pressure, typically 150 psi above ambient, and delivers this reduced pressure gas to flexible hose conduit 14. The inventive inlet valve 15 is connected between the other end of conduit 14 at 14' and the inlet 16' of regulator second stage 16. The diver holds the regulator 16 in his mouth and is delivered breathable gas via mouthpiece 17 upon inhalation demand.

Advantageously, the central axis of connections 14' and 16' are oblique to one another and are free to swivel so that regulator 16 can be moved to any position without binding conduit 14.

Referring to FIGS. 2 and 3, the inlet valve 15 has a body 22 generally cylindrical in shape. Skewed at an oblique angle, typically 45 degrees, to the central axis of body 22 is a threaded inlet 18 configured to mate with the standard hose connection 14' of underwater breathing systems. In line with the central axis of body 22 is connecting nut 17 with internal threads 30 and related O-ring 24 (FIG. 5), configured to swivelably mate with the standard inlet connection of regulator second stages.

An interior body 21, shown in FIG. 4, generally cylindrical in shape, sealed to body 22 by O-rings 23, facilitates assembly of the inventive valve. Cylindrical passages 42 and 43 of interior body 21 and cylindrical passage 41 of body 22 intersect and thereby provide a continuous conduit through which gas can freely flow.

As shown in FIG. 3, lever 51 is generally "U" shaped and joins transverse pin 25 at holes 48 (FIG. 5). An interference fit between lever 51 and holes 48 of pin 25 ensure that these components will not separate once they have been pressed together. As shown in FIG. 5, the central portion of pin 25 is reduced in crossection by a pair of opposed arcuate recesses 50a and 50b. This reduced section 50 serves as a gate which, when rotated to position 50', blocks passage 43. O-ring seals 46 enable free rotation of pin 25 and subsequent rotation of gate 50 without gas leakage from body 22. Additionally, transverse pin 25 serves to hold inner body 21 and body 22 together.

The movement of lever 51 is limited by protrusions 19 (FIGS. 2 and 3) in the closed position, and by protrusions 20 (FIG. 2) in the open position. Additionally, the nose 28 of piston 26 (FIG. 4) engages the central portion of lever 51 at 29 when the lever is in the open position. This engagement latches the lever in the open position which precludes the possibility of accidentally closing the valve when the diver is using the regulator.

Piston 26 is sized to fit at the end of passage 43 and is sealed by O-ring 27. Internal pressure against piston 26 forces it outward to maintain engagement 29 with lever 51. When the diver desires to close the valve, movement of lever 51 towards the closed position will force back the piston 26 thereby releasing the lever. However, when air is being supplied from the tank 11, the holding force typically generated by the piston 26 is two pounds. As noted, this is sufficient to prevent accidental closure of the valve when air is being supplied, as during actual diving.

Although the illustrated piston 26 arrangement is the preferred configuration, the same result can be achieved by a spring-loaded plunger. Furthermore, although the invention is illustrated as being a separate article that is threadingly connected to each of the conduit 14 and the second stage 16, the invention is not so limited. Alternatively, the inventive inlet valve may be mounted as an integral component of either or both of the conduit 14 and the second stage 16.

Advantageously, the gate 50 does not completely shut off the flow of gas through the valve even when situated in the closed position 50'. This is a safety feature. In the event that the regulator first stage 13 should malfunction so that high pressure gas from the tank 11 is supplied to the conduit 14, some of this air would leak past the closed valve gate 50' and be exhausted via the second stage 16. If the gate 50 totally shut the valve 15, such excess pressure could rupture the conduit 14.

I claim:

1. An inlet valve for use with a breathing regulator second stage which is connectable to a source of breathable gas, comprising:
    a valve body having a passage therethrough, said body containing a flow-closing valve in said passage, and being connectable in the gas circuit to said second stage,
    a control member for said valve extending externally of of said body,
    a detent member attached to said body and having an element projecting externally to said body and being urged into an orientation in which said element retains said control member with said valve in the open, flow enabling position, and wherein said detent member comprises:
    a piston in said body having an end within said passage and exposed to the inlet gas pressure therein, said piston having an element projecting through an opening in said body and situated so that said control member will be retained with the valve in the open, flow enabling position when said piston element is urged outwardly of said body by pressure of gas from said source.

2. An inlet valve for use with a breathing regulator second stage which is connectable to a source of breathable gas, comprising:
    a valve body having a passage therethrough, said body containing a flow-closing valve rotational about an axis in said passage, and being connectable in the gas circuit to said second stage,
    a control member for said valve extending externally of said body, and
    a detent member attached to said body and having a projecting element urged into an orientation in which said element retains said control member with said valve in the open, flow enabling position, and
    a piston in said body and exposed to the inlet gas pressure in said passage, said piston having an element projecting through an opening in said body and situated so that said control member will be retained with the valve in the open, flow enabling position when said piston element whose motion is generally perpendicular to said axis is urged outwardly of said body by the pressure of gas from said source.

* * * * *